US012637204B2

(12) United States Patent
Fraval

(10) Patent No.: US 12,637,204 B2
(45) Date of Patent: May 26, 2026

(54) METHOD FOR DIAGNOSING A STATE OF DETERIORATION OF AN UPLOCK

(71) Applicant: SAFRAN LANDING SYSTEMS, Velizy-Villacoublay (FR)

(72) Inventor: Jérôme Fraval, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 122 days.

(21) Appl. No.: 18/834,507

(22) PCT Filed: Feb. 8, 2023

(86) PCT No.: PCT/EP2023/053035
§ 371 (c)(1),
(2) Date: Jul. 30, 2024

(87) PCT Pub. No.: WO2023/152147
PCT Pub. Date: Aug. 17, 2023

(65) Prior Publication Data
US 2025/0171135 A1     May 29, 2025

(30) Foreign Application Priority Data
Feb. 8, 2022     (FR) ....................................... 2201076

(51) Int. Cl.
*B64C 25/28*          (2006.01)
*B64D 45/00*          (2006.01)
*F15B 20/00*          (2006.01)

(52) U.S. Cl.
CPC .............. *B64C 25/28* (2013.01); *F15B 20/00* (2013.01); *B64D 2045/0085* (2013.01); *F15B 2211/87* (2013.01)

(58) Field of Classification Search
CPC ...... B64C 25/28; F15B 20/00; F15B 2211/87; F15B 2211/50554; F15B 2211/528;
(Continued)

(56) References Cited

U.S. PATENT DOCUMENTS 2,567,114 A * 9/1951 Linn ........................ B64C 25/26
                                                            24/643
8,061,654 B2 * 11/2011 Meyer ..................... B64C 25/26
                                                            244/102 R
(Continued)

FOREIGN PATENT DOCUMENTS

DE        102 51 821 B3        4/2004
EP        3 498 602 A1         6/2019
EP        3 594 508 A1         1/2020

OTHER PUBLICATIONS

International Search Report mailed Apr. 18, 2023, issued in corresponding International Application No. PCT/EP2023/053035, filed Feb. 8, 2023, 6 pages.

(Continued)

*Primary Examiner* — Patrick C Williams

(74) *Attorney, Agent, or Firm* — CHRISTENSEN O'CONNOR JOHNSON KINDNESS PLLC

(57)          ABSTRACT

A method diagnoses a state of deterioration of an uplock having an unlocking actuator provided with a hydraulic cylinder. The method includes the step of supplying the cylinder with pressurized fluid with an evolution law according to which the pressure of the fluid is, for a predetermined period, equal to a predetermined pressure lower than a full pressure, then equal to the full pressure. The method further includes the steps of determining a time of deactivation of the uplock and comparing it with the time when the predetermined time period ends; and deducing therefrom a state of deterioration of the uplock.

13 Claims, 11 Drawing Sheets

(58) Field of Classification Search
CPC .. F15B 2211/565; F15B 13/042; F15B 21/10;
B64D 2045/0085
See application file for complete search history.

(56) References Cited

U.S. PATENT DOCUMENTS

| 12,030,619 | B2 * | 7/2024 | Pascal | E05B 81/72 |
| 2013/0075527 | A1 * | 3/2013 | Lecourtier | B64C 25/28 |
| | | | | 244/129.5 |
| 2020/0269973 | A1 * | 8/2020 | McCambridge | H04L 67/12 |
| 2020/0377224 | A1 | 12/2020 | Brighton et al. | |
| 2021/0394891 | A1 * | 12/2021 | Wells | B64D 45/0005 |

OTHER PUBLICATIONS

Written Opinion mailed Apr. 18, 2023, issued in corresponding
International Application No. PCT/EP2023/053035, filed Feb. 8,
2023, 7 pages.

* cited by examiner

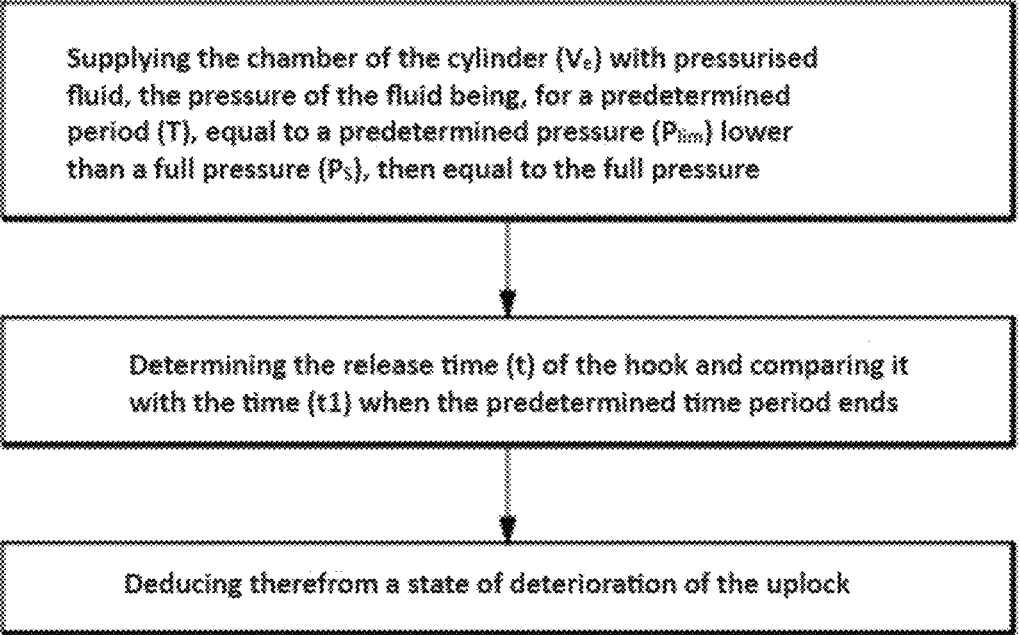

Supplying the chamber of the cylinder ($V_e$) with pressurised fluid, the pressure of the fluid being, for a predetermined period (T), equal to a predetermined pressure ($P_{lim}$) lower than a full pressure ($P_S$), then equal to the full pressure Determining the release time (t) of the hook and comparing it with the time (t1) when the predetermined time period ends Deducing therefrom a state of deterioration of the uplock

Fig. 7

METHOD FOR DIAGNOSING A STATE OF DETERIORATION OF AN UPLOCK

The invention relates to uplocks such as those which are used in aircraft for the retention, in the retracted position, of landing gears or of doors, and relates more specifically to a method for diagnosing a state of deterioration of such an uplock.

The invention also relates to a hydraulic circuit for supplying a cylinder to implement such a method.

BACKGROUND OF THE INVENTION

Aircrafts provided with retractable landing gears are known, with holds intended to receive these landing gears when the aircraft is in flight, and with doors for closing these holds. The deployment and the retraction of the landing gears, just like the opening and the closing of the doors, are done using operating actuators such as cylinders.

When the landing gear arrives in the retracted position, it is automatically held in this position by one or more uplocks. The same applies when the door arrives in the closed position.

In a manner which is known per se, the uplock comprises a hook which is pivotally mounted between a release position and a retaining position of a tapped nut fixed on the landing gear or the door, and a locking member which is returned by a spring to a position for locking the hook when this is brought into the retaining position, and which is pushed back by an unlocking actuator in order to enable the hook to swing towards a release position and thus release the tapped nut.

The unlocking actuator generally comprises a hydraulic cylinder comprising a body, inside which a rod associated with a piston can slide. The rod is arranged to act on the locking member in view of pushing it back to an unlocking position.

The correct operation of the uplock, and in particular, its unlocking performance, can be defined by the actuation force level required by the cylinder to enable the release of the tapped nut. This force level is characterised, in particular by the frictions generated in the connections and contacts between the different parts composing the uplock (seals carried by the piston, pivot connection of the locking member and of the hook, contact between the locking member and the hook, etc.).

It is known to minimise these frictions by adding grease/lubricant to guarantee the correct operation of the uplock, but also its integrity facing wear. This addition requires the opening of the uplock and is generally performed according to a regular maintenance schedule corresponding to a preventive maintenance performed according to predetermined criteria (commissioning period, number of cycles performed, etc.), and the aim of which is to reduce the probability of failure of the uplock. This type of maintenance requires, in particular, to know the behaviour of the uplock, its methods of deterioration and the average time of correct operation between two elements of damage, and does not make it possible to optimise the maintenance operation frequencies of the uplock. For this, the behaviour of the uplock should be specifically characterised in varied environments which are dependent on the operating conditions of the aircraft by the company which operates it.

To overcome these disadvantages, a predictive maintenance has been considered, consisting of measuring the pressure in the cylinder of the uplock to monitor, in real time, the actuation force, and to define a pressure threshold from which a maintenance operation must be performed.

Yet, the pressure increase speed of an uplock cylinder is generally very high (greater than 1000 bars per second). This is the result of a low volume of fluid compressed by the piston and has the consequence of leading to a very rapid unlocking of the hook. This rapidity makes observing the time and the unlocking pressure of the hook difficult. FIGS. 1A and 1B illustrate two examples of evolution of the pressure in an uplock cylinder. FIG. 1A corresponds to a normal operating state of the uplock for which the time and the unlocking pressure are respectively substantially equal to 1.07 seconds and 60 bars. FIG. 1B corresponds to a deteriorated operating state of the uplock (the friction increased between the internal parts composing the uplock following, for example, a maintenance defect of said uplock) for which the time and the unlocking pressure are respectively substantially equal to 1.16 seconds and 160 bars.

Between the normal operating and state the deteriorated operating the unlocking time state, difference is lower than 100 milliseconds, such that an observation frequency greater than 100 Hertz would be necessary at the landing gear computer to guarantee a relevant detection of the deterioration of the uplock.

Yet, the execution frequency of such a computer is generally substantially equal to 12.5 Hertz. Increasing it would have the effect of leading to an increase of the load of the computer (generally, CPU (Central Processing Unit) load is referred to), and therefore of the sizing of the computer.

AIM OF THE INVENTION

The invention aims to propose a solution overcoming at least some of the abovementioned disadvantages.

SUMMARY OF THE INVENTION

To this end, a method is proposed for diagnosing a state of deterioration of an uplock for the retention of a tapped nut of a movable element, the uplock comprising:
  a hook pivoting between a release position and a position for retaining the tapped nut;
  a locking member pivoting between a locking position, in which the hook is immobilised in the retaining position by the locking member, and an unlocking position, in which the hook is free to be moved under the thrust of the tapped nut of the movable element; and
  an unlocking actuator comprising a hydraulic cylinder supplied to act on the locking member in view of pushing it back to the unlocking position.

According to the invention, the method comprises, during a release sequence of the hook immobilised in the retaining position by the locking member, the following steps:
  a) supplying the cylinder with pressurised fluid with an evolution law according to which the pressure of the fluid is, for a predetermined period, lower than a full pressure, then equal to the full pressure;
  b) determining a time of deactivation of the hook and comparing it with the time when the predetermined period ends;
  c) deducing, from the comparison performed in step b), a state of deterioration of the uplock.

By delaying the application of the full pressure in the chamber of the cylinder, such a method makes it possible to diagnose a deterioration of the unlocking performance of the uplock before the complete loss of the unlocking function, and therefore to schedule a maintenance of the uplock making it possible to defend against a latent breakdown of it. This detection of the deterioration of the unlocking performance of the uplock is based only on the release time of the hook and does not require the use of a pressure sensor.

Particularly, the predetermined period is slightly greater than a maximum period for releasing the hook under nominal conditions for greasing/lubricating the uplock.

Particularly, the release time of the hook is determined from a proximity sensor arranged to detect the presence of said hook in the retaining position.

Particularly, the method further comprises the step consisting of scheduling, from the state of d) deterioration of the uplock, a maintenance of said uplock.

According to a particular embodiment, the pressure of the fluid is, for the predetermined period, substantially constant and equal to a predetermined pressure.

According to another particular embodiment, the pressure of the fluid is, for the predetermined period, increasing stepwise until reaching a predetermined pressure.

Particularly, the pressure of the fluid is, for the predetermined period, equal to a pressure lower than the predetermined pressure, then equal to the determined pressure.

According to another particular embodiment, the pressure of the fluid is, for the predetermined period, increasing continuously until reaching a predetermined pressure.

Particularly, the predetermined period is greater than a maximum release pressure of the hook under nominal conditions for greasing/lubricating the uplock.

The invention also relates to a hydraulic circuit for supplying a cylinder, enabling such a method to be implemented. The circuit comprising a delay valve having an inlet port intended to be connected to a pressurised fluid source, an outlet port intended to be connected to the cylinder and a return port, and the delay valve comprising a distributor, comprising:

- a supply port connected to the inlet port via a first restrictor;
- a first service port forming the outlet port;
- a second service port forming the return port;
- a slide valve which is movable between a pressure limiting position, towards which it is returned automatically by a spring, and in which the supply port is connected to the outlet port and to the return port via a third restrictor, and a full pressure position, in which the slide valve blocks the return port; and
- a control chamber connected to the inlet port via a second restrictor to move the movable slide valve.

Particularly, a first check valve is placed in parallel with the first restrictor, the first check valve letting the fluid pass from the support port to the inlet port.

Particularly, a second check valve is placed in parallel with the second restrictor, the second check valve letting the fluid pass from the control chamber to the inlet port.

The invention also relates to an aircraft comprising an uplock for the retention of a retractable landing gear or of a door containing a hold intended to receive the landing gear, the uplock comprising an unlocking actuator which comprises a hydraulic cylinder connected to such a hydraulic circuit.

BRIEF DESCRIPTION OF THE DRAWINGS

The invention will be best understood in the light of the description below, which is purely illustrative and non-limiting, and must be read regarding the accompanying figures, among which:

FIG. 7 illustrates a method for diagnosing a state of deterioration of an uplock, according to a particular embodiment of the invention;

DETAILED DESCRIPTION OF THE INVENTION

Figures 1A, 1B:
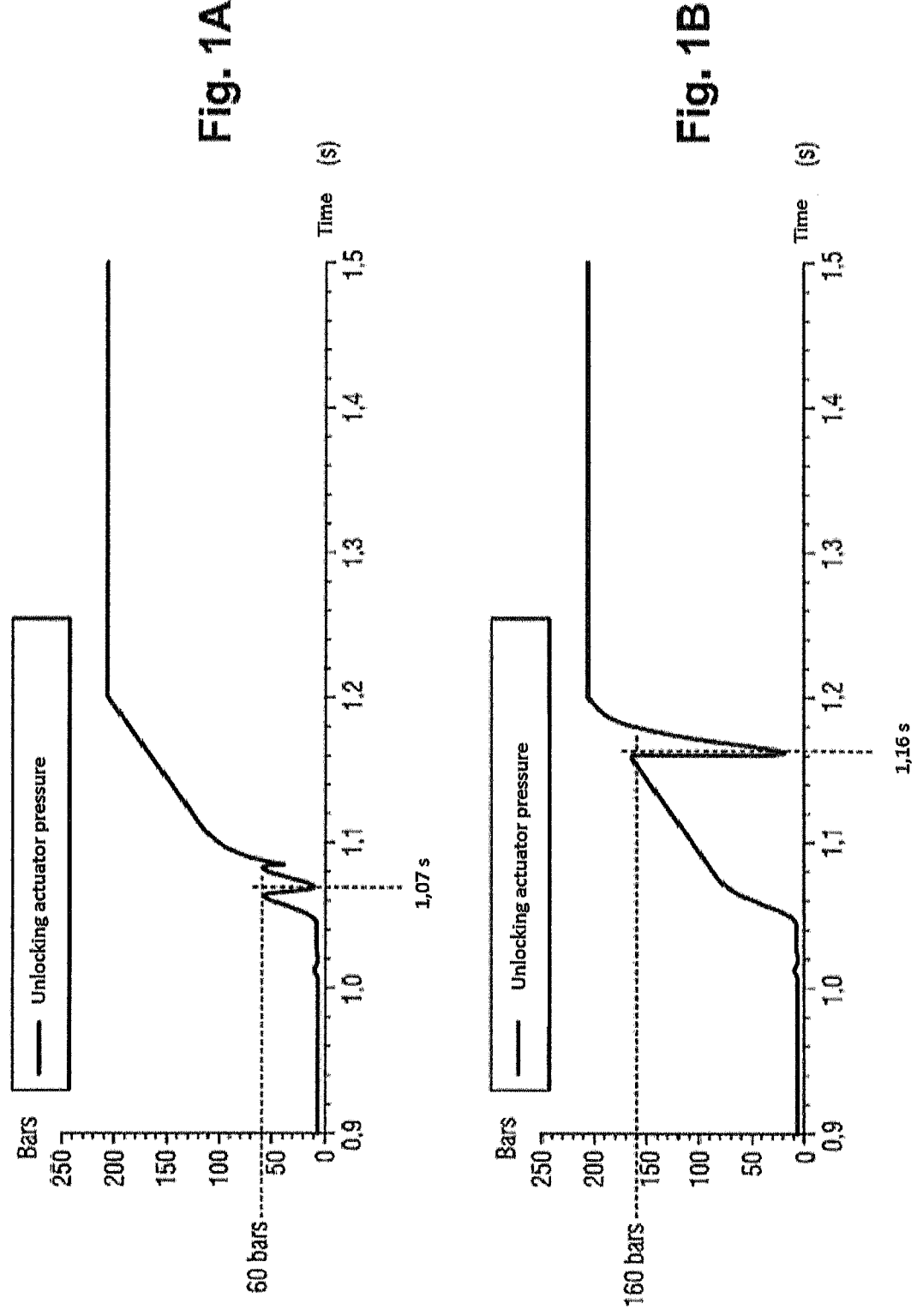
FIG. 1A illustrates the evolution of the pressure in an unlocking cylinder equipping an uplock according to the prior art, in a normal operating state.
FIG. 1b is similar to FIG. 1A, the uplock being in a deteriorated operating state.
Figure 2:
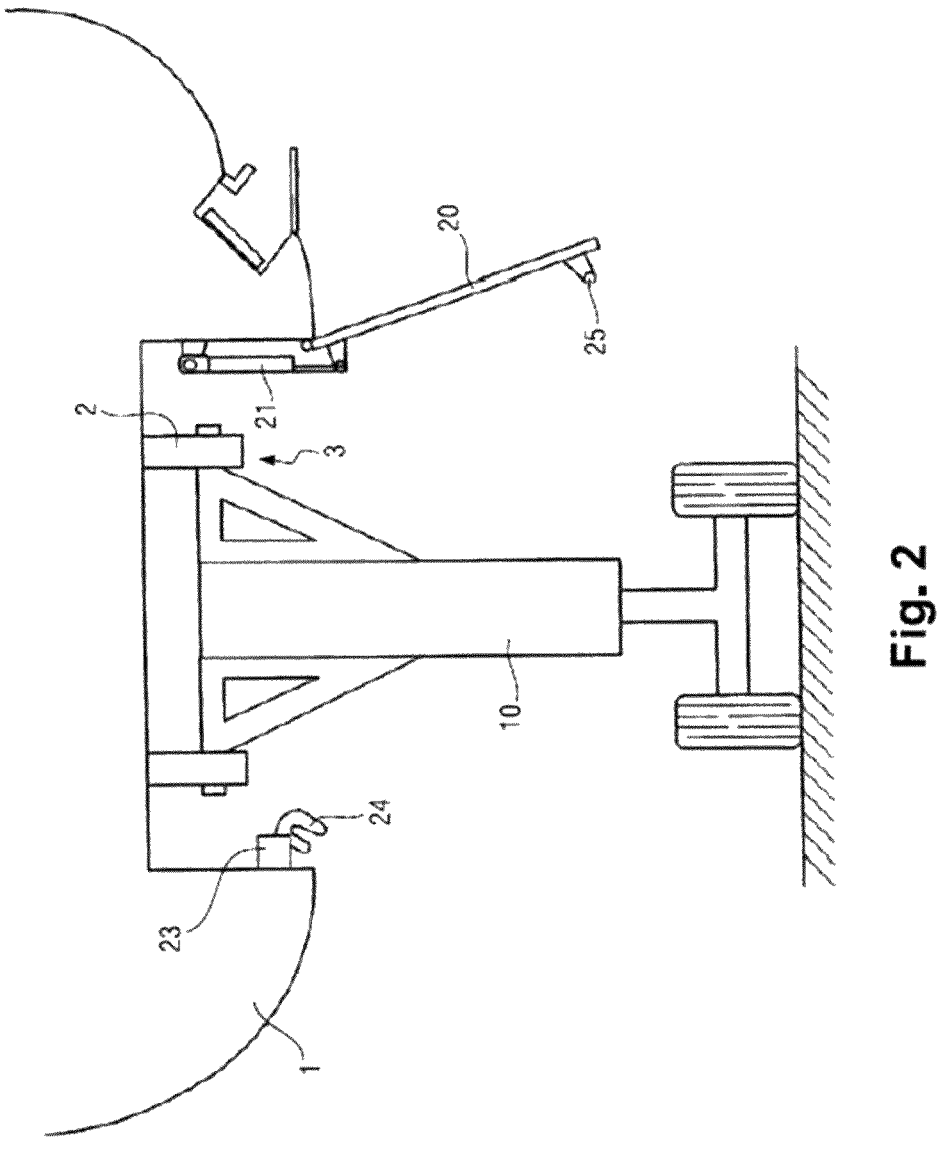
FIG. 2 is a schematic view of a device for locking a door of an aircraft landing gear via an uplock.

As illustrated in FIG. 2, the invention is described, in this case, in relation to an aircraft 1 comprising a landing gear 10 articulated on a structure 2 of the aircraft 1 between a deployed position illustrated in this case, and a retracted position, in which the landing gear 10 is received in a hold 3 closable by a door 20.

Figure 3:
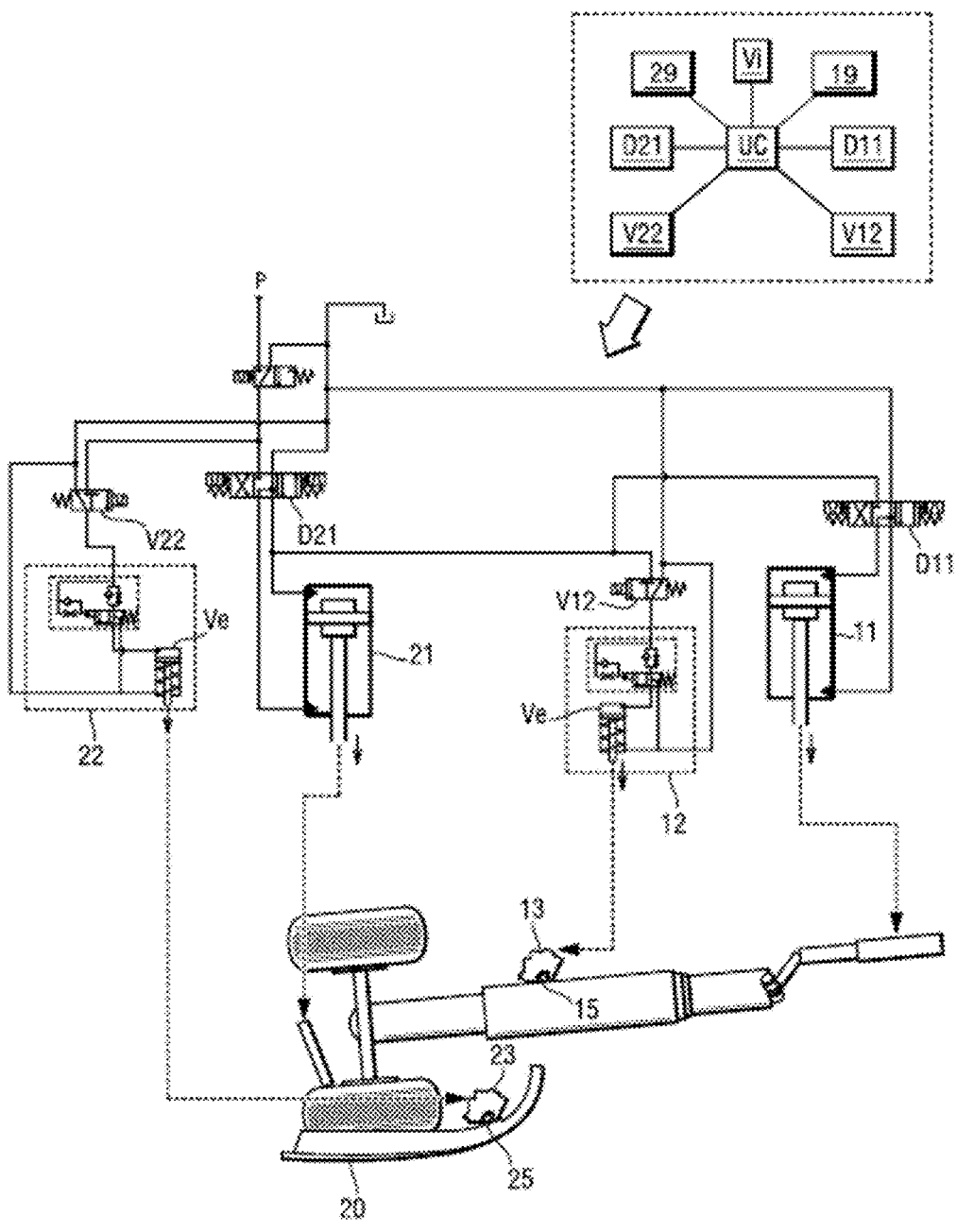
FIG. 3 is a schematic view of a hydraulic circuit, according to a particular embodiment of the invention, to supply an unlocking cylinder of an uplock, to implement the method illustrated in FIG. 7.

In reference to FIG. 3, a dual effect cylinder 11 is coupled to the landing gear 10 and makes it possible to move it between the retracted position and the deployed position. The landing gear 10 is held in the retracted position by an uplock 13 provided with a hook 14 making it possible to hook a tapped nut 15 secured to the landing gear 10 when the latter arrives in the retracted position. The unhooking of the hook 14 is controlled by a hydromechanical unlocking actuator 12.

Similarly, the dual effect cylinder 21 is coupled to the door 20 and makes it possible to move it between an open position enabling the deployment and the retraction of the landing gear, and a closed position closing the hold 3. The door 20 is held in the closed position by an uplock 23 secured to the structure of the aircraft 1. The uplock 23 is provided with a hook 24 making it possible to hook a tapped nut 25 secured to the door 20 when said door 20 arrives in the closed position. The unhooking of the hook 24 is controlled by a hydromechanical unlocking actuator 22.

The uplocks 13, 23 are, in this case, of identical structures, just like the tapped nuts 15, 25 and the unlocking actuators 12, 22.

The cylinder 11 serving to move the landing gear 10 is controlled by a monostable distributor D11 connected to a pressurised fluid source P. The unlocking actuator 12 makes it possible to deactivate the uplock 13 and is controlled by a monostable valve V12 connected to the pressurised fluid source P.

The cylinder 21 serving to move the landing gear 20 is controlled by a monostable distributor D21 connected to the pressurised fluid source P. The unlocking actuator 22 makes it possible to deactivate the uplock 23 and is controlled by a monostable valve V22 connected to the pressurised fluid source P.

A monostable isolation valve $V_i$ makes it possible to isolate, in particular during certain flight phases, the distributors D11, D21 and the valves V12, V22 of the pressurised fluid source P, in order to limit the risk of unintentional deployment and retraction of the landing gear 10, but also the unintentional opening and closing of the door 20.

It will be noted that, in case of failure of the uplock 13, the landing gear 10 would, despite it all, be retained in the hold 3 by the door 20 locked in the closed position via the uplock 23, such that the locking of the door 20 tends to limit any unintentional deployment of the landing gear 10.

The aircraft 1 also comprises a control unit UC arranged to control the distributors D21, D22 connected to the cylinders 11, 21 and the valves V12, V22 connected to the unlocking actuators 12, 22, so as to control the deployment and the retraction of the landing gear 10, the locking of said landing gear 10 in the retracted position, the opening and the closing of the door 20, and the locking of the door 20 in the closed position.

Figures 4A, 4B, 4C:
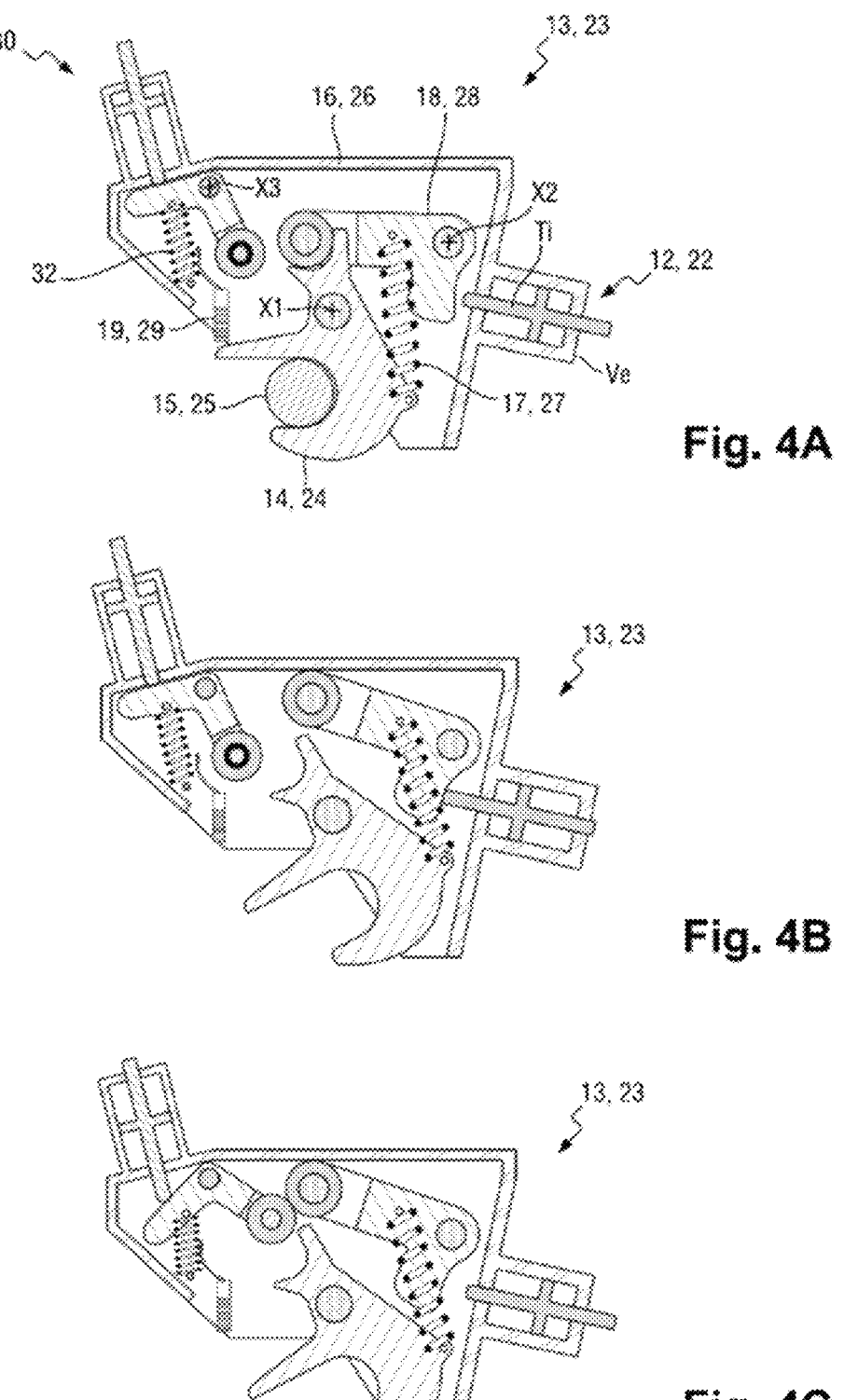
FIG. 4A is a schematic, front view of an uplock, illustrated while the hook is in the retaining position, the locking member being in the locking position.
FIG. 4B is a view similar to that of FIG. 4A, illustrating the hook in the release position, the locking member being in the unlocking position via the action of the cylinder.
FIG. 4C is a view similar to that of FIG. 4A, illustrating the hook in the release position, the locking member being in the unlocking position via the action of an emergency device.

In reference to FIG. 4A, the uplocks 13, 23 comprise, in a manner known per se, a body 16, 26 carrying a first pivot and a second pivot defining parallel pivot axes X1, X2. The hook 14, 24 is pivotally mounted on the first pivot about the axis X1 between a retaining position (FIG. 4A) and a release position, towards which it is returned by a spring 17, 27 (FIGS. 4B, 4C). The hook 14, 24 comprises a hooking part in which the tapped nut 15, 25 of the landing gear 10 (or of the door 20) is intended to be retained by the uplock 13, 23 to immobilise said landing gear 10 in the retracted position (or said door 20 in the closed position). To do this, the landing gear 10 (or the door 20) is moved by the cylinder 11, 21 and the tapped nut 15, 25 pushes the hook 14, 24 back towards the retaining position in which it retains the tapped nut 15, 25. To this end, a locking member 18, 28 is pivotally mounted on the second pivot about the axis X2 and comprises, at an end, a roller bearing on a cam profile of the hook 14, 24. The locking member 18, 28 pivots between a locking position towards which it is automatically returned by the spring 17, 27, and that it automatically reaches when the hook 14, 24 arrives in the retaining position (FIG. 4A), and an unlocking position (FIGS. 4B, 4C). In the locking position, the locking member 18, 28 locks the hook 14, 24 in the retaining position. To release the tapped nut 15, 25, the unlocking actuator 12, 22 pushes the locking member 18, 28 back towards the unlocking position, which enables the hook 14, 24 to pivot towards the release position, and therefore to the tapped nut 15, 25 to leave the hook 14, 24.

In a known manner, the uplocks 13, 23 also comprise a proximity sensor 19, 29 of the inductive type connected to the control unit UC and arranged to detect the presence of the hook 14, 24 in the retaining position.

The uplocks 13, 23 also comprise an emergency actuator 30 able to unlock the hook 14, 24 if the unlocking actuator 12, 22 is inoperative. To this end, an unlocking member 31 is pivotally mounted on a third pivot about an axis X3 parallel to the axes X1, X2, and comprises a roller at an end. The unlocking member 31 pivots between a rest position, towards which it is automatically returned by a spring 32 (FIGS. 4A, 4B), and an unlocking position, in which the roller of the unlocking member 31 bears on the roller of the locking member 18, 28 (FIG. 4C). To release the tapped nut 15, 25, the emergency actuator 30 pushes the unlocking member 31 back which, by joining its unlocking position, itself pushes the locking member 18, 28 back towards its unlocking position, which makes it possible for the hook 14, 24 to pivot towards the release position and therefore for the tapped nut 15, 25 to leave the hook 14, 24.

Figure 5:
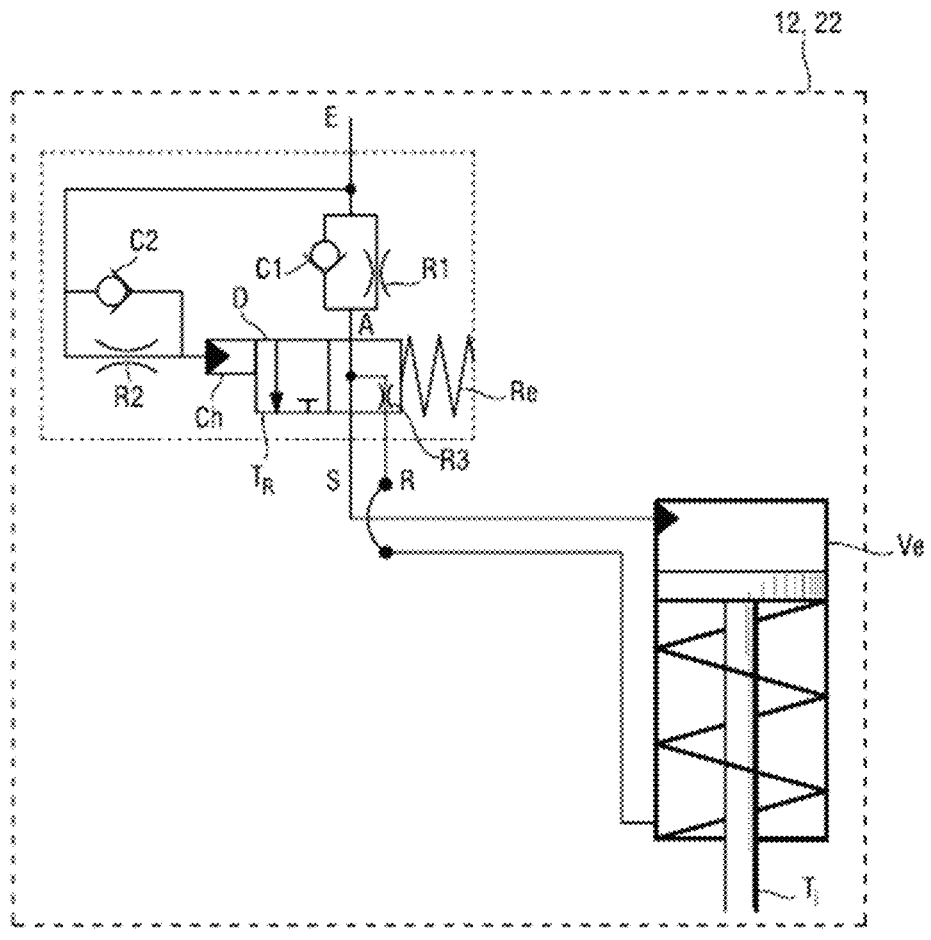
FIG. 5 is a schematic view of an unlocking actuator according to a particular embodiment of the invention.

In reference to FIG. 5, the unlocking actuators 12, 22 comprises a hydraulic cylinder $V_e$ comprising a body, in which a rod $T_1$ slides by being associated with a piston which defines a chamber with the body. The locking member 18, 28 is in the locking position when the rod $T_1$ is in the retracted position (FIG. 4A), and is in the unlocking position when the rod $T_1$ is in the extended position (FIG. 4B).

The unlocking actuator 12, 22 also comprises a so-called "delay" valve $V_r$ connected to the chamber of the cylinder $V_e$. The delay valve $V_r$ comprises:

an inlet port E connected to the pressurised fluid source P via the control valve V12, V22, an outlet port S connected to the chamber of the cylinder $V_e$, and a return port R connected to a reservoir.

The delay valve $V_r$ also comprises a distributor D comprising:

a supply port A connected to the inlet port E via a first restrictor R1 and a first check valve C1 disposed in parallel to one another, the first check valve C1 letting the fluid pass from the supply port A to the inlet port;

a first service port forming the outlet port S, a second service port forming the return port R, a slide valve $T_r$ which is movable between a so-called "pressure limiting" position, towards which it is returned automatically by a spring $R_e$, and in which the supply port A is connected to the outlet port S and to the return port R via a third restrictor R3, and a so-called "full pressure" position, in which it blocks the return port R; and a control chamber $C_H$ for the movement of the slide valve $T_r$, connected to the inlet port E via a second restrictor R2 and a second check valve C2 disposed in parallel with one another, the second check valve C2 letting the fluid pass from the control chamber $C_H$ to the inlet port E.

The operation of the delay valve $V_r$ is as follows.

When a pressurised fluid enters into the delay valve $V_r$ through the inlet port E and when the slide valve $T_r$ is in its rest position (FIG. 6A), the fluid tends to join, almost simultaneously, the outlet port S via the first restrictor R1, the return port R via the first restrictor R1 and the third restrictor R3, and the control chamber $C_H$ of the distributor D via the second restrictor R2. The pressure of the fluid

Figures 6A, 6B, 6C:
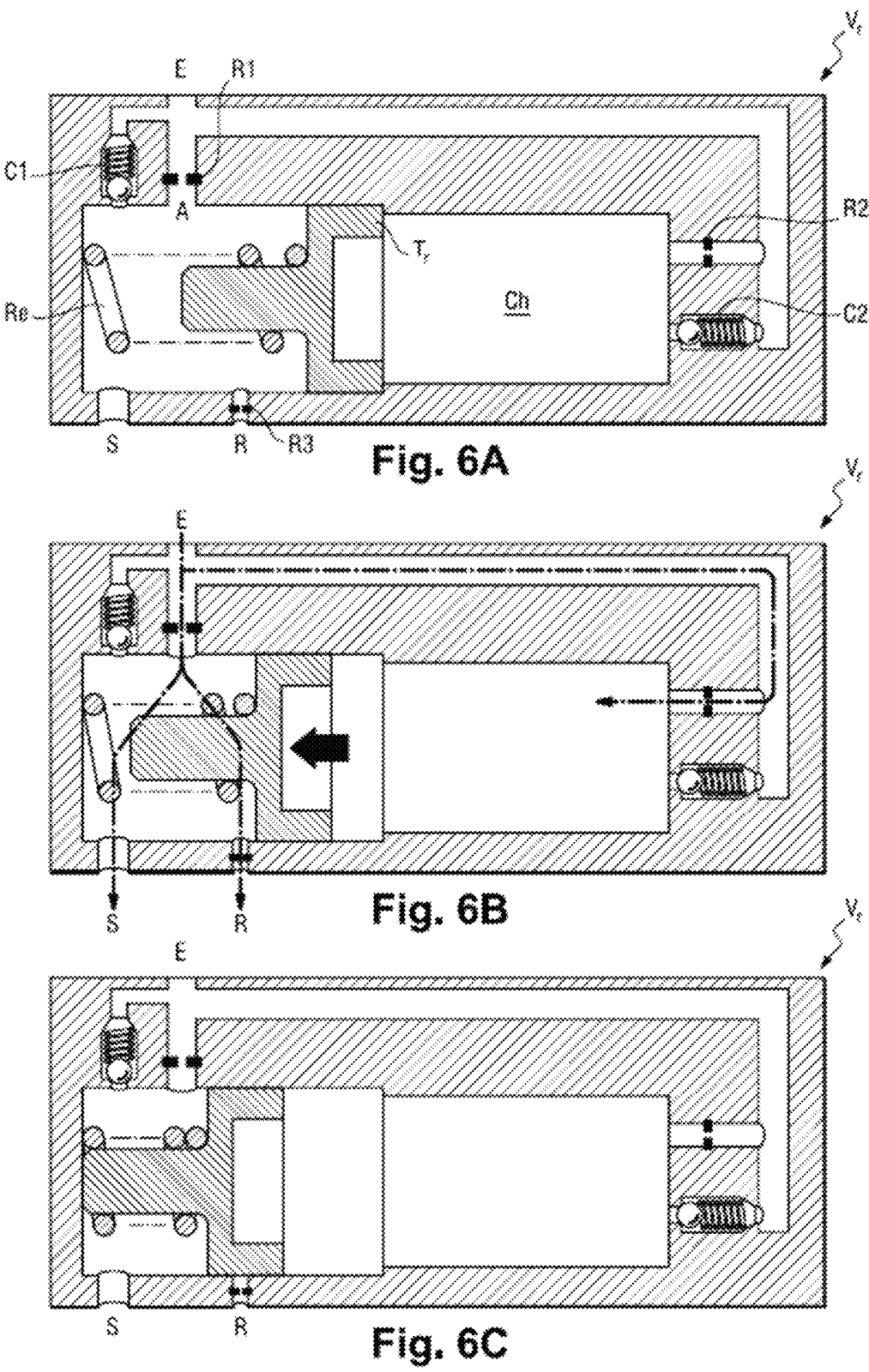
FIG. 6A is a cross-sectional view of the delay valve illustrated in FIG. 5, in a rest state.
FIG. 6B is similar to FIG. 6A, illustrating the valve in a limited pressure state.
FIG. 6C is similar to FIG. 6A, illustrating the valve in a full pressure state.

7 exiting through the outlet port S thus results from the load loss through the first restrictor R1 and the third restrictor R3, and is therefore lower than that entering through the inlet port E. At the same time, the pressure in the control chamber $C_H$ tends to increase and therefore to lead to a movement of the slide valve T, to its full pressure position (FIG. 6B). This movement speed of the slide valve $T_r$ is defined by the second restrictor R2.

As the pressure increases in the control chamber $C_H$, the slide valve $T_r$ finishes by joining its full pressure position, in which it completely blocks the return port R (FIG. 6C). The pressure of the fluid exiting through the outlet port S thus results from the load loss through the first restrictor R1 and thus becomes substantially equal to that entering through the inlet port E.

It therefore appears that before becoming substantially equal to that entering through the inlet port E, the pressure of the fluid exiting from the outlet port S is limited for a period dependent on the movement speed of the slide valve $T_r$, which is itself defined by the second restrictor R2.

When the inlet port E of the delay valve $V_r$ is no longer supplied with pressurised fluid, the pressure in the control chamber $C_H$ tends to decrease and therefore to lead to a movement of the slide valve T, to its pressure limiting position under the effect of the spring $R_e$. The depressurising of the control chamber $C_H$ is done through the second check valve C2, and that of the outlet port S through the first check valve C1.

In order to monitor the integrity of the uplock 13, 23 and thus be protected from a latent breakdown of it, the control unit UC is arranged to implement, via the delay valve $V_r$, a method for diagnosing a state of deterioration of the uplock 13, 23. In reference to FIGS. 7 and 8, the different steps of the method will now be detailed.

During a sequence for unlocking the landing gear 10 or the door 20, the valve V12, V22 is first controlled to connect, from a time $t_0$, the unlocking actuator 12, 22 to the pressurised fluid source P. The pressure of the inlet port E of the unlocking actuator is thus substantially equal to the pressure $P_s$ of the pressurised fluid source P which is generally equal to 206 bars or 350 bars according to the nominal pressure of the hydraulic generation of the aircraft, and which is, in this case, equal to 206 bars.

Until a time $t_1$ (corresponding to a first phase), the pressure of the outlet port S, and therefore that of the chamber of the cylinder $V_e$, is lower than that of the inlet port E and is limited by the delay valve $V_r$. The delay valve $V_r$ and, in particular, its first and third restrictors R1, R3 are arranged such that the pressure of the outlet port S is, until the time $t_1$, at most equal to a pressure $P_{lim}$ slightly greater than a maximum unlocking pressure $P_{max}$ representative of a maximum force level required to release the hook 14, 24 via the cylinder $V_e$ under nominal conditions for greasing/lubricating the uplock 13, 23. The pressure $P_{max}$ is generally between 70 bars and 90 bars, and is, in this case, equal to 85 bars. The pressure $P_{lim}$ is generally between 90 bars and 110 bars, and is, in this case, equal to 95 bars.

The times $t_0$ and $t_1$ define a period T corresponding substantially to the time that the slide valve $T_r$ of the delay valve $V_r$ takes to pass from its pressure limit position to its full pressure position. The delay valve $V_r$ and in particular, its second restrictor R2 are arranged, such that the period T is greater than a period $T_{max}$ representative of a maximum unlocking time required to release the hook 14, 24 via the cylinder $V_e$ under nominal conditions for greasing/lubricating the uplock 13, 23. The period T is, in this case, between 0.5 second and 1 second.

After the time $t_1$ (corresponding to a second phase), the pressure of the outlet port S, and therefore to that of the cylinder chamber $V_e$, tend to become substantially equal to the pressure $P_s$ of the source P.

The pressure of the outlet port S is thus, for the period T, substantially constant and equal to the pressure $P_{lim}$, then equal to the pressure $P_s$.

During the unlocking sequence of the landing gear 10 (or of the door 20), the control unit UC determines, via the proximity sensor 19, 29, the time t when the hook 14, 24 leaves the retaining position, in other words, the time t when the rod $T_1$ of the cylinder $V_e$ has substantially finished pushing the locking member 18, 28 back towards its unlocking position. The time t corresponds to the time when the pressure in the chamber of the cylinder $V_e$ reaches a minimum after having fallen suddenly during the movement of the rod $T_1$.

The time t is then compared with the time t1.

Figure 8:
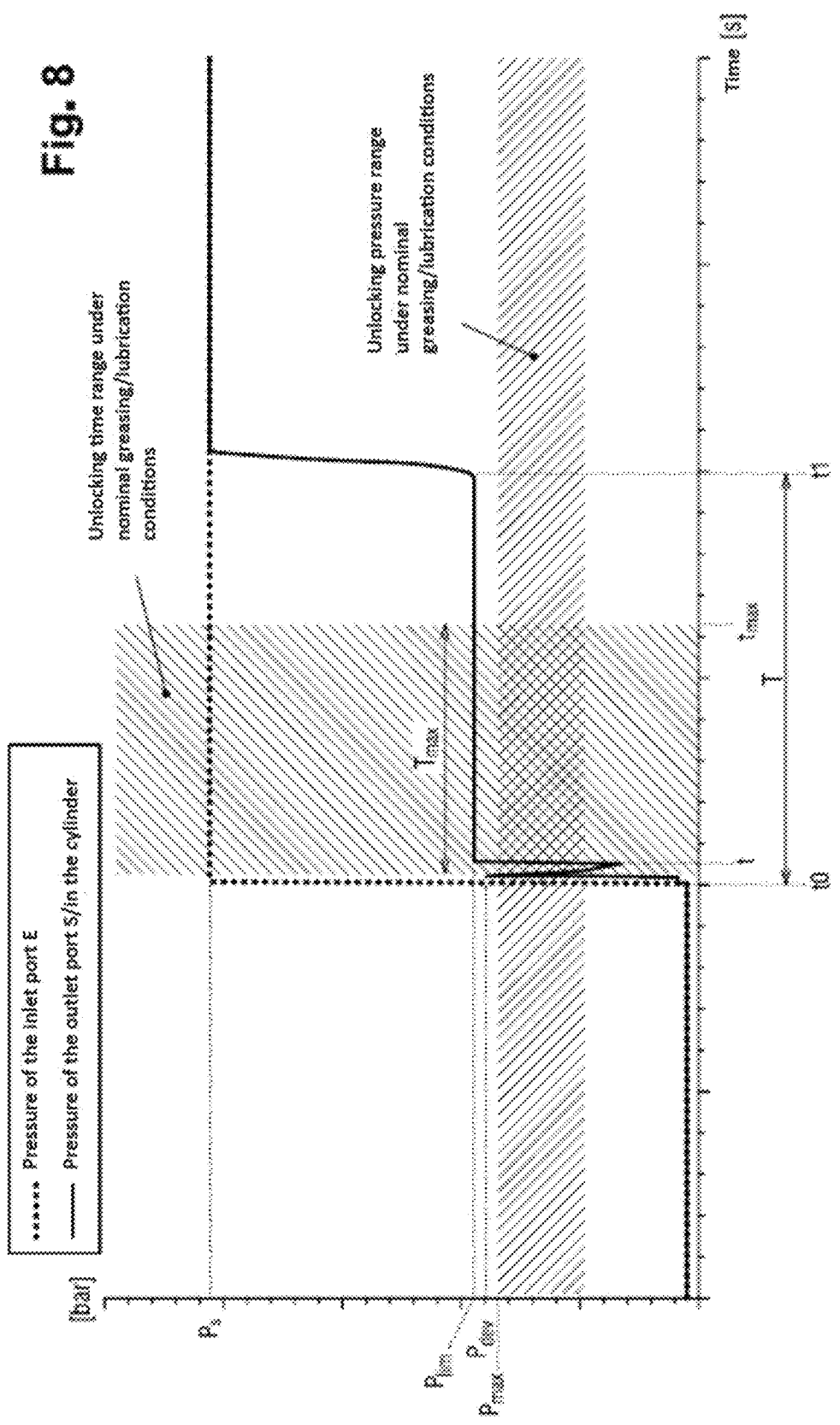
FIG. 8 illustrates the evolution of the pressure in the cylinder of the unlocking actuator illustrated in FIG. 5, the cylinder being supplied with pressurised fluid with a first evolution law.

If the time t is located before the time t1 as is illustrated in FIG. 8, thus the unlocking pressure $P_{dev}$ required by the cylinder $V_e$ to release the hook 14, 24 is less than or equal to the maximum unlocking pressure $P_{max}$ representative of the maximum force level required to release the hook 14, 24 under nominal conditions of greasing/lubricating the uplock 13, 23. It is deduced from this that uplock the 13, 23 is in a nominal greasing/lubricating state and does not require grease or lubricant to be added.

On the contrary, if the time t is located before the time t1, thus the unlocking pressure $P_{dev}$ required by the cylinder $V_e$ to release the hook 14, 24 is greater than the maximum unlocking pressure $P_{max}$ representative of the maximum force level required to release the hook 14, 24 under nominal conditions of greasing/lubricating the uplock 13, 23. It is deduced from this that the uplock 13, 23 is in a deteriorated state and requires grease or lubricant to be added.

It will be understood that by delaying the application of the full pressure in the chamber of the cylinder $V_e$ for the period T, such a method makes it possible to diagnose a deterioration of the unlocking performance of the uplock 13, 23 before the complete loss of the unlocking function, and therefore to schedule a maintenance of the uplock 13, 23 making it possible to be protected from a latent breakdown of it (adding lubricant/grease, demounting of the casing for inspection and/or replacement of a part of said casing, etc.). Detecting the deterioration of the unlocking performance of the uplock 13, 23 is based only on the release time of the hook 14, 24 and does not require the use of a pressure sensor.

A state of deterioration level $N_d$ of the unlocking performance of the uplock 13, 23 can further be calculated by the control unit UC via the following equation:

$$N_d = \frac{t - t_{max}}{t_M - t_{max}}$$

where:
   $t_{max}$ defines with $t_0$, the period $T_{max}$; and
   $t_M$ is a predefined time beyond which a maintenance operation is required (the aircraft 1 is no longer authorised to fly).

Expressed as a percentage, the state of deterioration level $N_d$ is recorded in a memory of the control unit UC in order, in particular, to be able to observe an evolution of the state of deterioration level $N_d$ of the uplock 13, 23 during several successive unlocking sequences of the landing gear 10 (or of the door 20) and thus estimate a maximum number of unlocking sequences authorised before proceeding with a maintenance operation.

Figure 9:
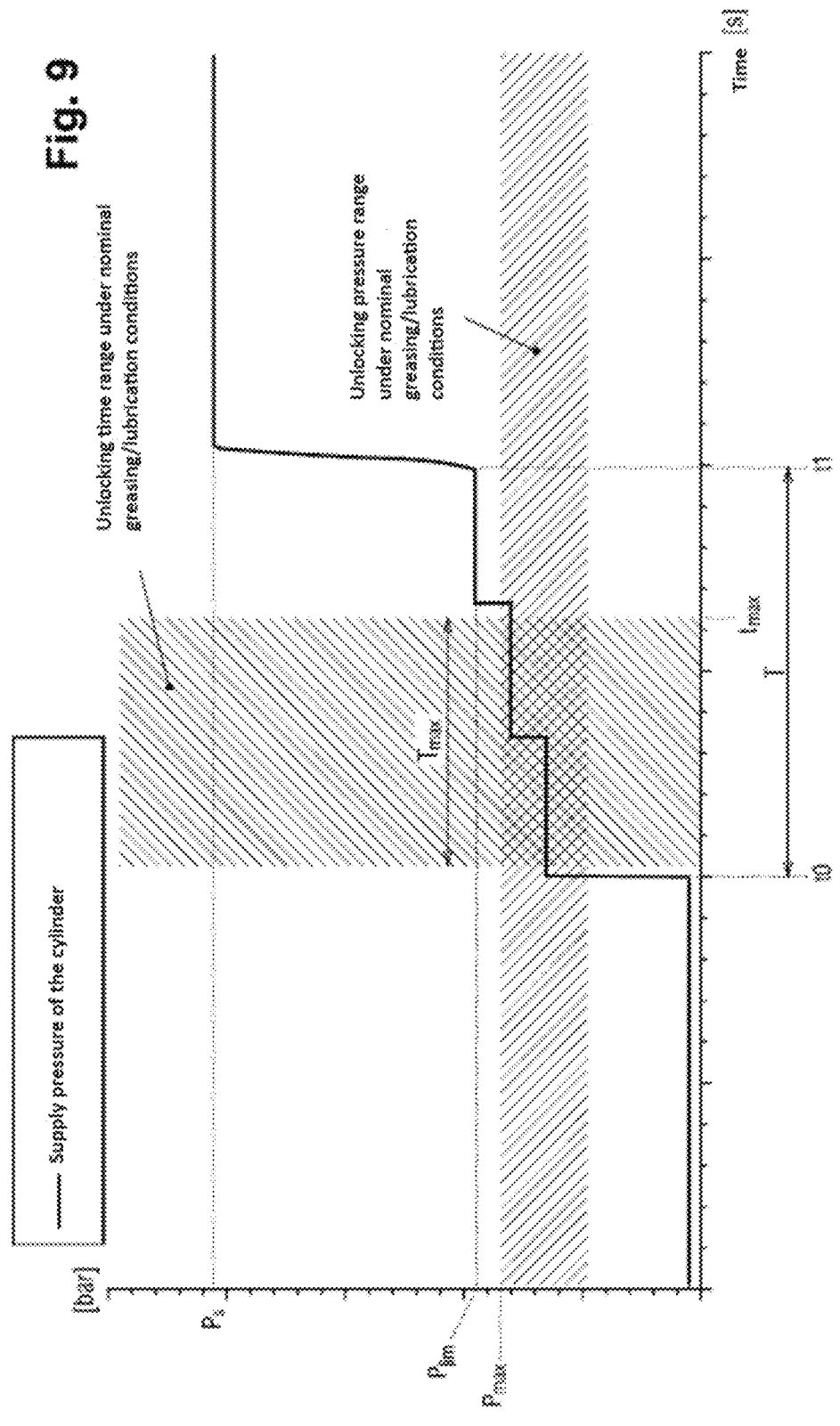
FIG. 9 illustrates a second evolution law of the supply pressure of the cylinder.

Although the supply pressure of the cylinder $V_e$ is, in this case, substantially constant for the period T (corresponding to the first phase), it can also increase by levels. For example, the supply pressure of the cylinder $V_e$ can, for the period T, be equal to a first pressure lower than the pressure $P_{lim}$, then be equal to a second pressure greater than the first pressure and lower than the pressure $P_{lim}$, then be equal to the pressure $P_{lim}$ (FIG. 9).

Figure 10:
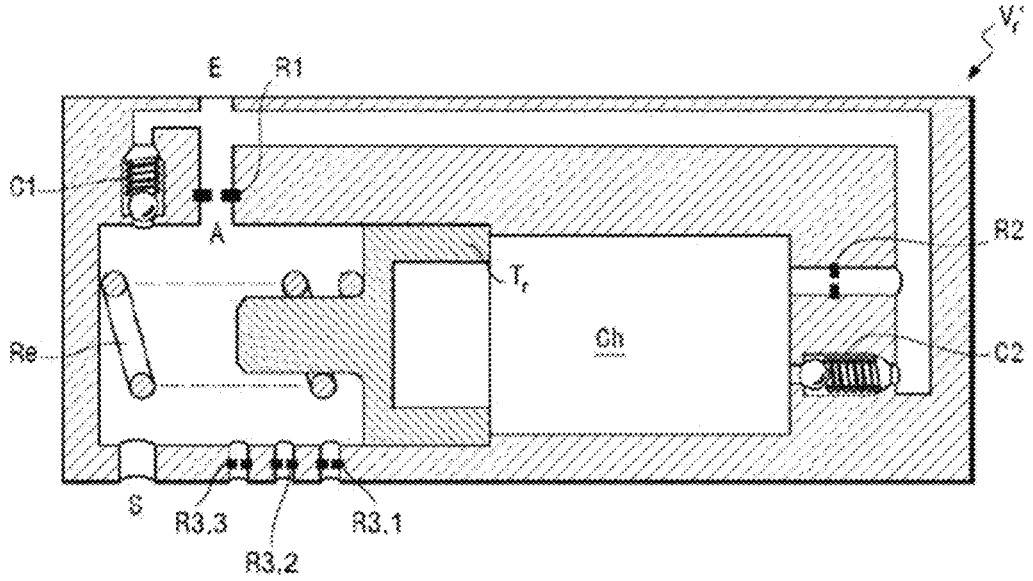
FIG. 10 is a cross-sectional view of the delay valve, making it possible to perform the second evolution law of the supply pressure illustrated in FIG. 9, in a rest state.

Such an evolution law of the supply pressure of the cylinder $V_e$ can be performed via a valve $V_r'$ being distinguished from the valve $V_r$ in that it comprises, not one but three return ports R, each provided with a third restrictor R3.1, R3.2, R3.3 (FIG. 10).

When a pressurised fluid enters into the delay valve $V_r'$ through the inlet port E and when the slide valve $T_r$ is in its rest position (represented in FIG. 10), the fluid tends to join, almost simultaneously:

the outlet port S via the first restrictor R1, the return ports R via the first restrictor R1 and the third restrictors R3.1, R3.2, R3.3, and the control chamber $C_H$ of the distributor D via the second restrictor R2.

The pressure of the fluid exiting through the outlet port S thus results from the load loss through the first restrictor R1 and third restrictors R3.1, R3.2, R3.3, and is therefore lower than that entering through the inlet port E. At the same time, the pressure in the control chamber $C_H$ tends to increase and therefore to lead to a movement of the slide valve $T_r$ to its full pressure position (not illustrated). This movement speed of the slide valve $T_r$ is defined by the second restrictor R2.

As the pressure increases in the control chamber $C_H$, the slide valve $T_r$ is moved to join its full pressure position by blocking, in turn, the third restrictors R3.1, R3.2, R3.3, such that the pressure of the fluid exiting through the outlet port S results;

initially, from the load loss through the first restrictor R1 and from the third restrictors R3.1, R3.2, R3.3 (the slide valve $T_r$ blocks none of the three return ports R);

secondly, from the load loss through the first restrictor R1 and from the third restrictors R3.2, R3.3 (the slide valve $T_r$ blocks one of the three return ports R, more specifically, the return port R provided with the restrictor R3.1);

thirdly, from the load loss through the first restrictor R1 and from the third restrictor R3.3 (the slide valve $T_r$ blocks two of the three return ports R, more specifically, the return ports R provided with the restrictors R3.1, R3.2); and fourthly, from the load loss through the first restrictor R1 (the slide valve $T_r$ blocks all of the return ports R) and thus becomes substantially equal to that entering through the inlet port E.

It therefore appears that before becoming substantially equal to the pressure entering through the inlet port E, the pressure of the fluid exiting from the outlet port S is limited to a first pressure then to a second pressure for a period dependent on the movement speed of the slide valve $T_r$, which is itself defined by the second restrictor R2.

When the inlet port E of the delay valve $V_r'$ is no longer supplied with pressurised fluid, the pressure in the control chamber $C_H$ tends to decrease and therefore to lead to a movement of the slide valve $T_r$ to its pressure limiting position under the effect of the spring $R_e$. The depressurising of the control chamber $C_H$ is done through the second check valve C2, and that of the outlet port S through the first check valve C1.

Figure 11:
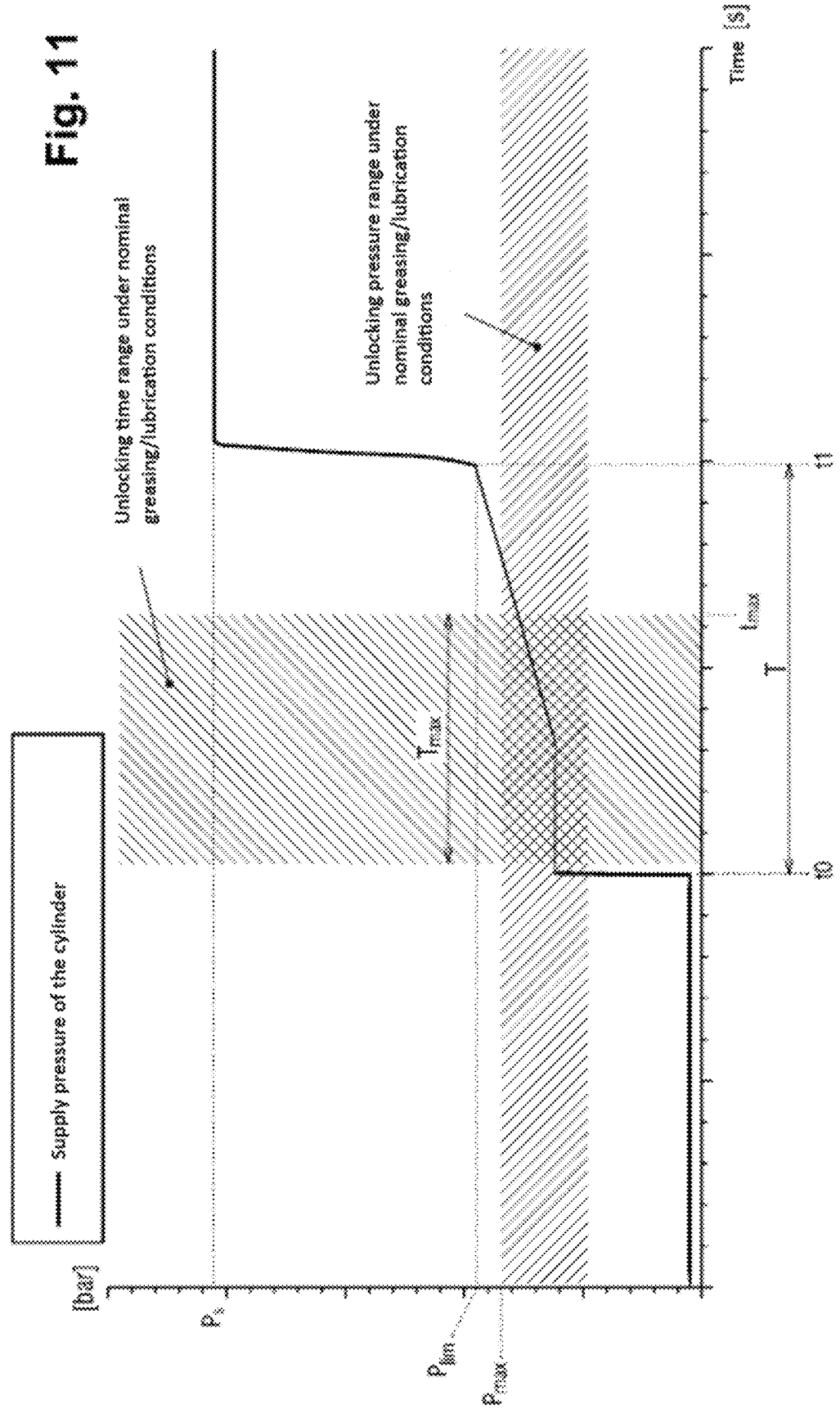
FIG. 11 illustrates a third evolution law of the supply pressure of the cylinder.

It can also be provided that the supply pressure of the cylinder $V_e$ increases continuously. For example, the supply pressure of the cylinder $V_e$ can, for the period T, increase linearly until reaching the pressure $P_{lim}$ (FIG. 11).

Such an evolution law of the supply pressure of the cylinder $V_e$ can be performed via a valve $V_r''$ being distinguished from the valve $V_r$ in that the slide valve $T_r$ comprises a frusto-conically-shaped outer surface Se arranged such that said slide valve $T_r$ blocks, during its passage from the pressure limiting position to the full pressure position, the return port R more progressively than if the outer surface Se was cylindrically-shaped (for a given movement speed of the slide valve $T_r$).

Figure 12:
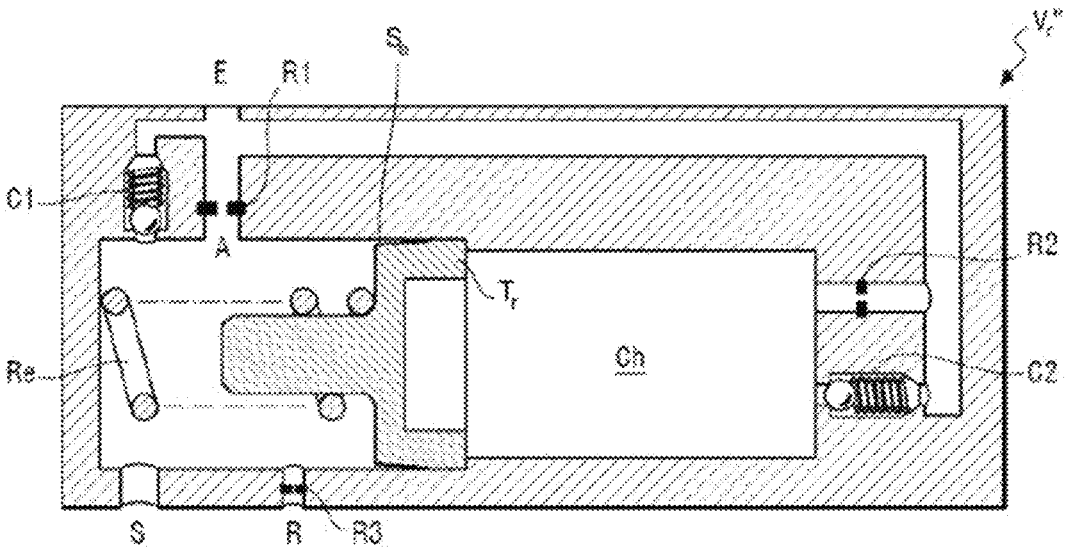
FIG. 12 is a cross-sectional view of the delay valve, making it possible to perform the third evolution law of the supply pressure illustrated in FIG. 11, in a rest state.

When a pressurised fluid enters into the delay valve $V_r''$ through the inlet port E and when the slide valve $T_r$ is in its rest position (represented in FIG. 12), the fluid tends to join, almost simultaneously, the outlet port S via the first restrictor R1, the return port R via the first restrictor R1 and the third restrictor R3, and the control chamber $C_H$ of the distributor D via the second restrictor R2. The pressure of the fluid exiting through the outlet port S thus results from the load loss through the first restrictor R1 and the third restrictor R3, and is therefore lower than that entering through the inlet port E. At the same time, the pressure in the control chamber $C_H$ tends to increase and therefore to lead to a movement of the slide valve $T_r$ to its full pressure position. This movement speed of the slide valve $T_r$ is defined by the second restrictor R2.

As the pressure increases in the control chamber $C_H$, the slide valve $T_r$ tends to join its full pressure position by progressively blocking the return port R, and this, until completely blocking it. The pressure of the fluid exiting through the outlet port S thus results from the load loss through the first restrictor R1 and thus becomes substantially equal to that entering through the inlet port E.

It therefore appears that before becoming substantially equal to the pressure entering through the inlet port E, the pressure of the fluid exiting from the outlet port S increases linearly for a period dependent on the movement speed of the slide valve $T_r$, which is itself defined by the second restrictor R2.

When the inlet port E of the delay valve $V_r''$ is not longer supplied with pressurised fluid, the pressure in the control chamber $C_H$ tends to decrease and therefore to lead to a movement of the slide valve $T_r$ to its pressure limiting position under the effect of the spring $R_e$. The depressurising of the control chamber $C_H$ is done through the second check valve C2, and that of the outlet port S through the first check valve C1.

By determining the release time t of the hook 14, 24, it is thus possible, with such evolution laws of the supply pressure of the cylinder $V_e$, to increase the unlocking pressure $P_{dev}$, and to determine the state of deterioration level $N_d$ of the performance of the uplock 13, 23 and to schedule a maintenance of said uplock 13, 23 in line with its state of deterioration. For example, an unlocking pressure $P_{dev}$ slightly lower than or greater than the maximum unlocking pressure $P_{max}$ can be representative of a lubrication/greasing defect of the uplock. Conversely, an unlocking pressure $P_{dev}$ broadly greater than the maximum unlocking pressure $P_{max}$ can be representative of a lubrication/greasing defect of the uplock or of a tearing of a surface coating of a part composing the uplock 13, 23.

By determining the release time t of the hook 14, 24 during several unlocking sequences of the landing gear 10 (or of the door 20), it is also possible to determine an evolution of said release time t and therefore to refine the scheduling of the maintenance of the uplock 13, 23. For example, a stability of the release time t can make it possible to delay the maintenance of the uplock 13, 23. Conversely, an increasing evolution of the release time t can make it possible to precisely schedule the maintenance of the uplock 13, 23. Also, a significant decrease of the release time t can confirm a tearing of a surface coating of a part composing the uplock 13, 23.

By determining the evolution of the state of deterioration level $N_d$ of the unlocking performance of the uplock 13, 23 during several unlocking sequences of the landing gear 10 (or of the door 20), it is also possible to refine the scheduling of the maintenance of the uplock 13, 23. For example, a significant increase of the state of deterioration level $N_d$ can cause a maintenance operation, even if the time t is lower than $t_{max}$.

Naturally, the invention is not limited to the embodiment described, but covers any variant coming within the scope of the invention as defined by the claims.

Although, in this case, the method is described in application to the unlocking actuator, it can also be described in application to the emergency actuator.

The actuators can be single or dual effect cylinders.

The delay valve can be integrated with the cylinder $V_e$.

The invention is applicable to any uplock which can be used, for example, for the door locking on vehicles other than aircraft or on buildings.

The invention claimed is:

1. A method for diagnosing a state of deterioration of an uplock for the retention of a tapped nut of a movable element, the uplock comprising:

a hook pivoting between a release position and a retaining position that retains the tapped nut;

a locking member pivoting between a locking position, in which the hook is immobilized in the retaining position by the locking member, and an unlocking position, in which the hook is free to be moved under a thrust of the tapped nut of the movable element; and an unlocking actuator comprising a hydraulic cylinder configured to act on the locking member in view of pushing it back to the unlocking position;

the method comprising, during a release sequence of the hook immobilised immobilized in the retaining position by the locking member, the following steps:

a) supplying the cylinder with pressurized fluid with an evolution law according to which the pressure of the fluid is, for a predetermined period, lower than a full pressure, then equal to the full pressure;

b) determining a release time of the hook and comparing the release time with a time when the predetermined time period ends; and c) deducing, from the comparison performed in step b), a state of deterioration of the uplock.

2. The method according to claim 1, wherein the predetermined period is greater than a maximum period for releasing the hook under nominal conditions for greasing/lubricating the uplock.

3. The method according to claim 1, wherein the release time of the hook is determined from a proximity sensor arranged to detect the presence of said hook in the retaining position.

4. The method according to claim 1, further comprising the step of: d) scheduling, from the state of deterioration of the uplock, a maintenance of said uplock.

5. The method according to claim 1, wherein the pressure of the fluid is, for the predetermined period, constant and equal to a predetermined pressure.

6. The method according to claim 5, wherein the predetermined pressure is greater than a maximum pressure for releasing the hook-under nominal conditions for greasing/lubricating the uplock.

7. The method according to claim 1, wherein the pressure of the fluid is, for the predetermined period, increasing stepwise until reaching a predetermined pressure.

8. The method according to claim 7, wherein the pressure of the fluid is, for the predetermined period, equal to a pressure lower than the predetermined pressure, then equal to the determined pressure.

9. The method according to claim 1, wherein the pressure of the fluid is, for the predetermined period, increasing continuously until reaching a predetermined pressure.

10. A hydraulic circuit for supplying a cylinder enabling the implementation of the method according to claim 1, the circuit comprising a delay valve having an inlet port configured to be connected to a pressurized fluid source, an outlet port configured to be connected to the cylinder and at least one return port, and the delay valve comprising a distributor comprising:

a supply port connected to the inlet port via a first restrictor;

a first service port forming the outlet port, at least one second service port forming the return port;

a slide valve which is movable between a pressure limiting position, towards which the slide valve is returned automatically by a spring, and in which the supply port is connected to the outlet port and to the return port via a third restrictor, and a full pressure position, in which the slide valve blocks the return port; and a control chamber connected to the inlet port via a second restrictor to move the movable slide valve.

11. The hydraulic circuit according to claim 10, wherein a first check valve is placed in parallel with the first restrictor, the first check valve letting the fluid pass from the support port to the inlet port.

12. The hydraulic circuit according to claim 10, wherein a second check valve is placed in parallel with the second restrictor, the second check valve letting the fluid pass from the control chamber to the inlet port.

13. An aircraft comprising an uplock configured to retain a retractable landing gear or of a door containing a hold configured to receive the landing gear, the uplock comprising an unlocking actuator which comprises a hydraulic cylinder connected to the hydraulic circuit according to claim 10.

* * * * *